United States Patent [19]

Finzel

[11] Patent Number: 4,654,236
[45] Date of Patent: Mar. 31, 1987

[54] PROCESS OF COATING TITANATE-SILANE PRIMED SURFACES

[75] Inventor: William A. Finzel, Midland, Mich.

[73] Assignee: Dow Corning Corporation, Midland, Mich.

[21] Appl. No.: 851,767

[22] Filed: Apr. 14, 1986

[51] Int. Cl.[4] .......................... B05D 1/36; B05D 3/12; C23C 22/00
[52] U.S. Cl. ............................... 427/409; 148/6.14 R; 427/140; 427/178; 427/142; 427/399; 427/407.1
[58] Field of Search .................... 148/6.14 R; 427/140, 427/178, 142, 399, 409, 407.1

[56] References Cited

U.S. PATENT DOCUMENTS

| | | | |
|---|---|---|---|
| 3,779,818 | 12/1973 | Shoemaker | 148/6.14 R |
| 4,110,129 | 8/1978 | Matsushima et al. | 148/6.15 R |
| 4,190,468 | 2/1980 | Kitayama et al. | 148/6.14 R X |
| 4,311,738 | 1/1982 | Chi | 427/387 |
| 4,341,558 | 7/1982 | Yashiro et al. | 106/14.12 |
| 4,421,569 | 12/1983 | Dichter et al. | 427/388.2 X |

*Primary Examiner*—Thurman K. Page
*Attorney, Agent, or Firm*—Christopher E. Blank

[57] ABSTRACT

A method for painting coil coated substrates which comprised (a) coating said substrate with a primer composition comprising organoxysilane, tetralkyltitanate, and a volatile organic solvent, (b) drying said primer coat, and (c) coating said dried primer coat with a protective coating.

9 Claims, No Drawings

PROCESS OF COATING TITANATE-SILANE PRIMED SURFACES

BACKGROUND OF THE INVENTION

Coil coated metal is often used as a building material in commercial buildings, and in the private home sector. Coil coated metal is very durable and requires very little maintenance, however, many of the buildings constructed with coil coated metal are beginning to show signs of weathering due to extended service. The weathered coatings of such buildings are fading and losing their capacity to protect the metal. Because the protective coatings used as the topcoat in coil coated metals are designed to have long service lives, they form relatively stable and chemically inert surfaces. These surfaces are difficult to recoat. Existing paint primers are not completely satisfactory in solving the problem of repainting coil coated surfaces. Existing paint primers allow one to recoat with a paint less durable and weatherable than the original coil coating, but they do not provide sufficient adhesion when one uses high performance paint. In order to extend the service life of buildings made from coil coated metal a method of effectively repainting such surfaces is required.

Coil coated metal is made by unrolling a coil of metal and treating the surface with a conversion coating such as zinc phosphate. The conversion coating is baked onto the metal surface, and a primer coat is applied and baked onto the surface (this primer coat should not be confused with the primer coat of the invention which is applied over the protective coating, rather than under it). Finally, a protective topcoat is applied and baked onto the surface and the metal is recoiled for shipping.

The coil coated surfaces of buildings weather in an uneven fashion. The area under the eaves of the building will not be as weathered as the portions of the building with the greatest southern exposure. Therefore, it is necessary to provide a primer that will allow new paint to adhere to both weathered and unweathered coil coated surfaces.

The present invention provides a method for painting coil coated surfaces with paints which are as durable and easy to maintain as the original coil coatings. The method of painting disclosed in the present application can be practiced in place on coil coated metal which has already been incorporated into buildings, thus allowing such surfaces to be repainted in the same manner as conventional buildings are repainted. Alternately, the method of the present application can be practiced to recoat coil coated metal which has not been installed.

SUMMARY OF THE INVENTION

This invention relates to a method for priming coil coated surfaces with a composition comprised of a tetraorganoxysilane, a tetraalkyltitanate, and a volatile organic solvent. This primer composition can be applied to the substrate in any typical fashion, such as by brushing, spraying, dipping, or the like.

The primer composition of this invention comprises a tetraalkyltitanate of the general formula $(RO)_4Ti$ where R independently denotes an alkyl radical with between 1 and 6 carbon atoms inclusive, or an alkoxyalkyl radical with between 2 and 12 carbon atoms inclusive; an organoxysilane of the general formula $(R'O)_{4-n}SiY_n$ where each R' independently denotes an alkyl radical with 1 to 12 carbons atoms, or an alkoxyalkyl radical with 2 to 12 carbon atoms, Y denotes a lower alkyl group with 1 to 6 carbons and n is 1 or 0; and, a nonreactive volatile organic solvent.

The invention is particularly useful for adhering paints which contain silicone-alkyd resins, silicone-acrylic resins, or silicone polyester resins to a weathered or unweathered coil coated surface.

DETAILED DESCRIPTION OF THE INVENTION

The present invention relates to a method for painting weathered and unweathered coil coated surfaces. In particular the invention comprises the steps of (a) applying a primer composition to a coil coated substrate, (b) drying said composition to form a primed surface, and (c) coating said primed surface with a protective coating.

The primer compositions used in the method of the invention are comprised of an organoxysilane of the general formula $(R'O)_{4-n}SiY_n$ where each R' independently denotes an alkyl radical with 1 to 12 carbon atoms, or an alkoxyalkyl radical with 2 to 12 carbon atoms, n is 0, or 1, and Y denotes an alkyl radical with 1 to 6 carbon atoms; a tetraalkyltitanate of the general formula $(RO)_4Ti$ where R represents an alkyl radical with 1 to 12 carbon atoms, or an alkoxyalkyl radical with 2 to 12 carbon atoms, and each R may be the same or different; and a volatile organic solvent. Specific organoxysilanes used in the primer compositions include, but are not limited to tetraethylorthosilicate, tetramethylorthosilicate, 2-methoxyethylorthosilicate, 1-methoxypropanol-2-orthosilicate, tetrabutylorthosilicate, octylorthosilicate, n-propylorthosilicate, methyltriethoxysilane, or methyltrimethoxysilane. Mixtures of different organoxysilanes can be used in the primer composition. A preferred combination of organoxysilanes is about equal parts of ethylorthosilicate and 2-methoxyethylorthosilicate. Another preferred combination is about equal parts of ethylorthosilicate and 1-methoxypropanol-2-orthosilicate.

Specific tetraalkyltitanates used in the primer composition of the invention method include, but are not limited to, tetrabutyltitanate, tetrapropyltitanate, and tetrahexyltitanate.

The nonreactive organic solvents used in the invention's primer composition act as carriers for the organoxysilane and tetraalkyltitanate. Therefore, the choice of the nonreactive organic solvent will depend upon a number of factors. First, the volatility of the solvent will depend upon the particular requirements of the job. While in general solvents which are more volatile are preferred in that they allow for shorter drying periods, less volatile solvents may be used in certain instances because of lower costs or other considerations. Another factor involved in the choice of the nonreactive solvent is the wettability of the primer composition. Wettability depends upon the surface being primed and the carrier solvent.

Specific nonreactive organic solvents used in the primer composition include, but are not limited to, naptha, toluene, heptane, methylisobutyl ketone, butyl acetate, and xylene. Other mineral spirits can be used in the primer composition as can vegetable oils, such as, linseed oil.

The proportions of each of the components of the primer composition can vary within certain limits. The tetraalkyltitanate should be present between 2 and 10 parts by weight. The organoxysilane should be present between 2 and 20 parts by weight. The nonreactive organic solvent should comprise a sufficient portion of the primer composition to facilitate coating of the substrate. Typically, the organic solvent should be present between 70 and 96 parts by weight. A preferred embodiment of the invention method uses a primer composition comprised of 5 grams (g) of tetrabutyltitanate, 10 g of 1-methoxypropanol 2-orthosilicate, and 85 grams of naptha spirits to prime a silicone modified polyester coil coated surface. Another preferred embodiment of the invention method employs a primer composition comprised of 5 g of tetrabutyltitanate, 5 g of ethylorthosilicate, 5 g of 2-methoxyethylorthosilicate, and 85 g of naptha spirits.

The primer composition may also further contain small amounts of platinum catalyst in order to promote more rapid curing, or small amounts of nonessential ingredients such as fugitive dyes.

Both the tetraalkyltitanates and organoxysilanes used in the primer compositions are commercially available materials.

The method of applying the primer composition to the substrate is not critical. The primer can be applied to the substrate by any conventional means such as brushing, spraying, dipping or the like. While the method of applying the primer to the substrate is unimportant it is important that the dried primer coat is relatively thin, i.e. about less than 0.1 mm thickness. In general, the thinner the primer coat is, the better the adhesion between the substrate and new coat of paint will be. The primer coat can be dried by any convenient means such as air drying, baking, or the like.

A wide range of substrates can be painted using the method of the invention. Preferably, the method of the invention is used to repaint painted surfaces. Most preferably the invention method is used to repaint coil coated surfaces. The substrates which can be primed by the method of the invention generally are painted surfaces. The types of painted surfaces includes alkyd painted surfaces, acrylic painted surfaces, polyester painted surfaces, both low and high solids contents, and various silicone modified paints. Silicone modified paints are those paints where the resin portion of the paint contains silicone resin, or a silicone modified organic resin (either a copolymer or a block copolymer of a silicone polymer and an organic polymer). Silicone modified resins are well known in the paint arts and include, but are not limited to, silicone-polyester resins, silicone-acrylic resins, and silicone-alkyd resins. The silicone resin portion of these resins are also well known in the paint arts. Generally, these resins are polysiloxanes with average alkyl and phenyl radical to silicon atom ratios of between 1.0 and 2.0.

The method of the invention also works to effectively prime such substrates as stainless steel, chrome, aluminum, titanium, galvanized steel, aluminum plated steel. The invention method can also be used to prime the surface of silicone resin paints, in particular, zinc bodied high temperature silicone resin paints. The invention method is most effective in priming weathered and unweathered coil coated metal, especially where the topcoat of the coil coating contains a silicone modified resin.

The primer coat formed in practicing the method of the invention can be cured by baking the coating, or by air drying. Since one of the objects of the invention is to provide a method for repainting coil coated surfaces that are already in service, air drying is generally preferred. The coating of paint applied over the cured primer can likewise be cured by baking or air drying.

EXAMPLES

The following examples illustrate either specific embodiments of the invention, or prior art examples. The examples do not delineate the full scope of the invention, but serve rather to provide real and specific embodiments which will help those skilled in the art to better understand the invention as defined in the claims.

EXAMPLE 1

This example demonstrates the criticality of the primer composition used to paint weathered and unweathered coil coated metal surfaces. Aluminum panels were coated with a silicone modified polyester resin containing paint and heat cured. Some of the panels were weathered by placing the panels in an ultraviolet weathering machine per the method described in ASTM G-23-Type E without light filters for 1000 hours. The weathering cycle consisted of 102 minutes of radiation followed by 18 minutes of radiation and condensation. Silicone alkyd resin paint was applied to a weathered and an unweathered panel, and dried. The silicone alkyd painted panels were tested for adhesion by cross-hatching the dry painted surface and determining the percent of the surface which still adhered to the coil coated substrate. The test procedure employed a metal cutting device which is capable of producing 11 parallel cuts. Two perpendicular cuts were made on the coated surface, a pressure-sensitive tape was placed on the resulting lattice and removed, and the percent adhesion was calculated by the method described in ASTM D 3359-78(b). This procedure was repeated using silicone acrylic paint, and silicone alkyd paint as the topcoats.

All three types of paint adhered well to the weathered coil coated surface, but none of the three types of paints adhered well to unweathered coil coated surfaces. Coating weathered coil coated surfaces can be accomplished rather easily, however, unweathered coatings present greater difficulties. The coil coated surfaces of buildings are not uniformly weathered. Portions under the eaves are not as weathered as surfaces with southern exposure.

A portion of a primer solution (A) comprised of 15 g tetrabutyltitanate and 85 grams of naptha solvent was applied to one weathered ($A^w$) and one unweathered ($A^{uw}$) silicone polyester coated aluminum panel. The primed panels were dried, and were painted with silicone alkyd paint and allowed to air dry. Each panel was then tested for adhesion. This procedure was repeated with a primer composition (B) comprised of 15 g normal propylorthosilicate and 85 g naptha solvent to produce panels B[w] and B[uw]. Finally, a primer composition (C) comprised of 10 g of tetraethylorthosilicate, 5 g of tetrabutyltitanate, and 85 g of naptha solvent was used to coat one weathered C[w] and one unweathered C[uw] silicone polyester coated panel. Again, each panel was tested for adhesion by the described method. The results of the test are summarized in Table 1.

TABLE 1

| Panel | Topcoat | Percent Adhesion Initial | 100 hrs. Weathering |
|---|---|---|---|
| Unprimed[w] | Silicone-alkyd | 100 | — |
| Unprimed[uw] | Silicone-alkyd | 0 | — |
| Unprimed[w] | Silicone-polyester | 100 | — |
| Unprimed[uw] | Silicone-polyester | 0 | — |
| Unprimed[w] | Silicone-acrylic | 100 | — |
| Unprimed[uw] | Silicone-acrylic | 0 | — |
| A[w] | Silicone-alkyd | 100 | 0 |
| A[uw] | Silicone-alkyd | 100 | 0 |
| B[w] | Silicone-alkyd | poorwetting | — |
| B[uw] | Silicone-alkyd | poorwetting | — |
| C[w] | Silicone-alkyd | 100 | 100 |
| C[uw] | Silicone-alkyd | 100 | 100 |

Note:
[w]denotes weathered panels;
[uw]denotes unweathered panels.

Primer A provided 100 percent adhesion of the silicone alkyd containing topcoat paint to both the weathered and unweathered panels. However, upon exposing the panels to ultraviolet radiation this primer began failing (the topcoat lost adhesion). Primer B formed beads on the panels and could not be uniformly applied to the surface of either panel, B[w] or B[uw]. The panels treated with primer B could not be coated with a topcoat because of the poor wetting of the primer. Primer C was easily applied to the panels, and gave very good adhesion between the new topcoat and the panel. The adhesion was undiminished with extended exposure to ultraviolet light.

This example demonstrates that a mixture of an organoxysilane and a tetralkyltitanate is required to prime the surface of a previously coil coated surface in order to achieve adequate adhesion of a high performance paint containing silicone modified resin.

EXAMPLE 2

This example illustrates some of the organoxysilanes which can be used in the primer composition employed in the practice of the method of the invention. A number of primer compositions were made which contained different organoxysilanes. Primer D comprised 5 g tetrabutyltitanate, 5 g of ethylorthosilicate, 5 g of methylcellosolve-orthosilicate, and 85 g of naptha solvent. Primer E comprised 5 g of tetrabutyltitanate, 5 g of 1-methoxypropanol 2-orthosilicate, 5 g of normal propylorthosilicate, and 85 g of naptha solvent. Primer F comprised 5 g tetrabutyltitanate, 10 g 1-methoxypropanol-2-orthosilicate, and 85 g of naptha solvent. Primer G comprised 5 g of tetrabutyltitanate, 5 g 2-methoxyethylorthosilicate, 5 g of normal propylorthosilicate, and 85 g of naptha solvent. Primer H comprised 10 g of normal propylorthosilicate, 5 g of tetrabutyltitanate, and 85 g of naptha solvent. Primer I comprised 10 g of methyl cellosolveorthosilicate, 5 g of tetrabutyltitanate, and 85 g of naptha solvent. Primer J comprised 10 g of ethylorthosilicate, 5 g of tetrabutyltitanate, and 85 g of naptha solvent.

Each of the primers was applied to a weathered and an unweathered coil coated panel, and then dried. These panels had been coated with a silicone modified polyester resin containing paint, and heat cured. The painted panels were equivalent to coil coated metal substrates. The primed panels were painted with a new topcoat of silicone alkyd paint which was then allowed to air dry. The adhesion of the new topcoat to the panel was then measured, the results of which are reported in Table 2. All of the primer compositions gave good adhesion between the coil coated surface and the new paint layer which demonstrates that a broad range of tetraalkoxysilanes can be used in the primer composition.

TABLE 2

| Silicone-polyester Undercoat | Primer | % Adhesion |
|---|---|---|
| Weathered | D | 100 |
| Unweathered | D | 95 |
| Weathered | E | 100 |
| Unweathered | E | 100 |
| Weathered | F | 100 |
| Unweathered | F | 100 |
| Weathered | G | 100 |
| Unweathered | G | 100 |
| Weathered | H | 100 |
| Unweathered | H | 100 |
| Weathered | I | 100 |
| Unweathered | I | 100 |
| Weathered | J | 100 |
| Unweathered | J | 100 |

EXAMPLE 3

This example illustrates some of the types of surfaces which can be effectively painted using the method of the invention. Primer G from Example 2 was used to coat all of the surfaces. This primer was sprayed on each of the panels and air dried. The air-dried, primed surfaces were then painted with a high gloss paint containing a silicone modified alkyd resin of the following formulation:
40 wt % naptha mineral spirits
27 wt % soya fatty acid alkyd
10 wt % phthalic anhydride
3 wt % glycerol
20 wt % silicone resin.

The high gloss paint was air dried overnight and its' adhesion to each panel was measured using the cross hatch method described in Example 1. The method provided very good adhesion between the high gloss silicone-alkyd paint and substrates such as unweathered silicone polyester paint, silicone alkyd paint, high solids silicone alkyd paint, alkyd paint, stainless steel, titanium, and commercially treated metal sold by Parker Rust-proofing of Detroit, MI such as C.R. Bonderite 37 TM (a cold rolled steel treated with zinc phosphate), Kolor Krust TM (tin plated steel), sold by Ekco Products of Chicago, IL and G.S. 1303 Bonderite TM (a complex oxide coating for galvanized steel) sold by Parker Rust-proofing of Detroit, MI.

The same substrates were painted with a medium gloss silicone alkyd paint with the same formulation as the high gloss paint, but which also included a particulate filler. The results of these experiments are tabulated in Table 3.

TABLE 3

| | | % Adhesion After | | |
|---|---|---|---|---|
| Substrate | Overcoat | 2 Days | 7 Days | 14 Days |
| Silicone polyester | High Gloss | 100 | 100 | 100 |

TABLE 3-continued

| Substrate | Overcoat | % Adhesion After | | |
|---|---|---|---|---|
| | | 2 Days | 7 Days | 14 Days |
| (Unweathered) | Medium Gloss | 100 | 100 | 100 |
| Silicone alkyd | High Gloss | 100 | 100 | 100 |
| | Medium Gloss | 100 | 100 | 100 |
| High solids | High Gloss | 100 | 100 | 100 |
| silicone alkyd | Medium Gloss | 100 | 100 | 100 |
| High heat white paint | High Gloss | 98 | 98 | 98 |
| (a zinc bodied silicone resin) | Medium Gloss | 50 | 70 | 72 |
| C.R. Steel | High Gloss | 99 | 98 | 98 |
| | Medium Gloss | 99 | 99 | 98 |
| Alkyd paint | High Gloss | 100 | 100 | 100 |
| | Medium Gloss | 100 | 100 | 100 |
| Galvanized steel | High Gloss | 25 | 70 | 50 |
| | Medium Gloss | 75 | 50 | 55 |
| Aluminum steel | High Gloss | 94 | 80 | 95 |
| | Medium Gloss | 80 | 60 | 60 |
| Titanium | High Gloss | 100 | 100 | 100 |
| | Medium Gloss | 98 | 98 | 98 |
| Stainless steel | High Gloss | 100 | 100 | 100 |
| | Medium Gloss | 99 | 99 | 99 |
| Kolor Krust TM | High Gloss | 100 | 100 | 100 |
| | Medium Gloss | 100 | 99 | 99 |
| C.R. Bonderite TM 37 | High Gloss | 100 | 100 | 100 |
| | Medium Gloss | 100 | 100 | 100 |
| G.S. 1303 Bonderite TM | High Gloss | 100 | 100 | 100 |
| | Medium Gloss | 98 | 80 | 82 |
| Water base | High Gloss | 90 | 98 | 100 |
| | Medium Gloss | 70 | 75 | 75 |

The results illustrate the wide range of substrates that can be effectively painted or repainted using the invention method.

EXAMPLE 4

This example illustrates the wide range of paints and protective coatings which can be used in step (c) of the invention method. Weathered and unweathered silicone polyester coil coated panels were coated with primer composition G of Example 2, the primer coat was dried, a coat of paint was spray coated on the primed surface and air dried. A number of types of paints were used, and the adhesion of each type of paint was measured by the cross-hatch method described in Example 1. A wide range of paints effectively adhered to coil coated surfaces using the invention method as shown by the results in Table 4. These paints contained one of the following types of resins; alkyd resins, silicone modified alkyd resins, water reducible silicone modified alkyd resins, silicone modified acrylic resins, acrylic resins and silicone modified polyester resins.

TABLE 4

| Topcoat | Undercoat | % Adhesion After | | |
|---|---|---|---|---|
| | | 2 Days | 7 Days | 14 Days |
| Silicone alkyd | Weathered silicone polyester | 100 | 100 | 100 |
| | Unweathered | 100 | 100 | 100 |
| Alkyd | Weathered | 100 | 100 | 100 |
| | Unweathered | 100 | 100 | 100 |
| Water reducible silicone alkyd | Weathered | 100 | 100 | 100 |
| | Unweathered | 100 | 100 | 100 |
| Water reducible alkyd | Weathered | 100 | 100 | 100 |
| | Unweathered | 100 | 100 | 100 |
| High solids silicone alkyd | Weathered | 100 | 100 | 100 |
| | Unweathered | 100 | 100 | 100 |
| High solids alkyd | Weathered | 100 | 100 | 100 |
| | Unweathered | 100 | 100 | 100 |
| Silicone acrylic | Weathered | 100 | 100 | 100 |
| | Unweathered | 100 | 100 | 100 |
| Acrylic | Weathered | 100 | 100 | 100 |

EXAMPLE 5

This example illustrates the effectiveness of the invention method in painting metal surfaces. A steel panel was painted with the primer composition G of Example 2. The primer was air dried and coated with black stove paint which contained an organosilicon resin of the general formula $$A_n SiO_{4-n/2}$$

where A denotes a phenyl or methyl radical, n is on the average 1.4, and can be 1, 2, or 3, and the resin has a phenyl to methyl ratio of about 1.2. A separate steel panel which had not been coated with a primer was painted with the same black stove paint. Both panels were heated to 600° F. for 16 hours. The panel painted by the invention method was not affected by the heat aging, i.e., the paint on the primed panel still was firmly adhered to the panel. The paint on the unprimed panel completely flaked off the metal substrate.

EXAMPLE 6

This example illustrates the durability of surfaces painted using the invention method. Aluminum panels were coated with silicone polyester resin containing paint, and heat cured. The panels were then coated with the primer composition G of Example 2, and this primer coat was air dried. The primed panels were coated with various types of coatings. These coatings included water reducible alkyds (a'), alkyds in solvents (b'), silicone resin modified acrylics in solvents (c'), high solids silicone resin modified acrylics (d'), water reducible silicone alkyds (e'), water reducible silicone acrylics (f'), high solids alkyds (g'), acrylics in solvent (h' and i') and various silicone modified acrylics in emulsions (i' through r'). The silicone modified acrylics resins used in the emulsions were of three general types. Samples j'-m' were acrylic resins sold by Rohm & Haas as Rhoplex ®E-2054, with varying degrees of silicone resin cold blended with the acrylic resin. The level of silicone resin present in each sample is noted in Table 7. Samples n'-q' employed an acrylic resin sold by Rohm & Haas of Philadelphia, PA as Rhoplex ®AC829, which also included varying amounts of silicone resins. Samples r'-u' employed resin Rhoplex ®AC64 sold by Rohm & Haas. All of the silicone modified resins employed a silicone resin with a degree of substitution of about 1.2 and a phenyl radical to methyl radical ratio of about 1.0.

The water reducible alkyds paint (a') used was Kelsol TM 3960 sold by Spencer Kellog of Buffallo, NY. The alkyd paint (b') was a long oil alkyd sold by Cargill Corp. of Minneapolis, MN as Cargill 5070. The silicone modified acrylics (c') was 3 weight parts Acryloid TM B44 sold by Rohm & Haas and 1 weight part of the silicone resin used in the acrylic emulsions, and solvent. The high solids silicone acrylic (d') used the same resin mixture as c' with less solvent. The water reducible silicone alkyd paint (e') employed the long oil alkyd resin Cargill 5070 and the silicone resin used in the acrylic emulsions. The water reducible silicone acrylic used the same silicone resin with Acryloid TM B48S sold by Rohm & Haas. The high solids alkyd paint (g') used Cargill 5811 resin. The acrylics in solvent were Acryloid B48S (h') and Acryloid TM B44 (i') both sold by Rohm & Haas.

The resin coatings were allowed to air dry and the adhesion of each coating to the substrate was tested using the cross hatch method of Example 1. After initial testing each panel was subjected to accelerated weathering via a test method similar to ASTM G-53-84. This involved subjecting each panel to a multiple of weathering cycles comprised of 4 hours of U.V. radiation at 60° C. and 4 hours of condensation at 50° C. After 500 and 1000 hours of weathering each sample was again tested for adhesion. The results are reported in Table 6.

All of the overcoats retained nearly all of their adhesion to the panel even after 1000 hours of weathering.

TABLE 6

| Topcoat | Initial | % Adhesion 500 Hours | 1000 Hours |
|---|---|---|---|
| a' | 100 | 100 | 99 |
| b' | 100 | 100 | 100 |
| c' | 100 | 100 | 100 |
| d' | 100 | 100 | 100 |
| e' | 100 | 100 | 99 |
| f' | 100 | 100 | 100 |
| g' | 100 | 100 | 100 |
| h' | 100 | 100 | 100 |
| i' | 100 | 100 | 100 |
| j' (0% silicone modification) | 100 | 100 | 99 |
| k' (10% silicone modification) | 100 | 99 | 99 |
| l' (20% silicone modification) | 100 | 100 | 100 |
| m' (30% silicone modification) | 100 | 100 | 100 |
| n' (0% silicone modification) | 100 | 99 | 100 |
| o' (10% silicone modification) | 100 | 100 | 100 |
| p' (20% silicone modification) | 100 | 100 | 100 |
| q' (30% silicone modification) | 100 | 100 | 100 |
| r' (0% silicone modification) | 100 | 100 | 100 |
| s' (10% silicone modification) | 100 | 100 | 100 |
| t' (20% silicone modification) | 100 | 100 | 100 |
| u' (30% silicone modification) | 100 | 100 | 100 |

What is claimed is:

1. A method for painting substrates which comprises;
   (a) coating a substrate with a primer composition comprising a tetraalkyltitanate (I) of the general formula $(RO)_4Ti$ where R represents an alkyl radical with 1 to 12 carbon atoms, or an alkoxyalkyl radical with 2 to 12 carbon atoms, and each R may be the same or different; an organoxysilane (II) of the general formula $(R'O)_{4-n}SiY_n$ where each R' independently denotes an alkyl radical with 1 to 12 carbon atoms, or an alkoxyalkyl radical with 2 to 12 carbon atoms, n is 0, or 1, and Y denotes an alkyl radical with 1 to 6 carbon atoms; and nonreactive organic solvent (III);
   (b) curing said coating to form a primed surface; and,
   (c) coating said primed surface with paint.

2. The method of claim 3 wherein (I) comprises 2 to 10 parts by weight, (II) comprises 2–20 parts by weight and (III) comprises 70 to 90 parts by weight of said primer composition.

3. The method of claim 2 wherein said nonreactive organic solvent is naptha, toluene, heptane, methylisobutyl ketone, xylene, or butyl acetate.

4. The method of claim 3 wherein the organoxysilane is tetraethylorthosilicate, tetramethylorthosilicate, 2-methoxyethylorthosilicate, 1-methoxypropanol-2-orthosilicate, tetrabutylorthosilicate, octylorthosilicate, or normal-propylorthosilicate.

5. The method of claim 4 wherein the substrate being coated with said primer composition is aluminum, chrome, titanium, galvanized steel, stainless steel, aluminum steel, or has been painted with alkyd paint, silicone paint, silicone-alkyd paint, silicone polyester paint, high solids silicone-alkyd paint, acrylic paint, silicone-acrylic paint.

6. The method of claim 4 where the substrate being coated with the primer in step (a) is a substrate which has been coil coated with a paint containing a silicone-polyester copolymer resin.

7. The method of claim 4 where the substrate being coated with the primer in step (a) is a substrate which has been coated with a paint containing a silicone alkyd resin.

8. The method of claim 4 where the substrate being coated with primer in step (a) is a substrate which has been coated with a paint containing a silicone acrylic resin.

9. The method of claim 4 wherein the tetraalkyltitanate is tetrabutyltitanate.

* * * * *